United States Patent [19]

Hardouin et al.

[11] 3,954,864
[45] May 4, 1976

[54] CONCENTRATED SOLUTION OF A PHOSPHATE OF A DYESTUFF OF THE AURAMINE SERIES

[75] Inventors: Jean-Claude Henri Raoul Hardouin, Chantilly; Maurice Rene Jean Vallette, Precy-sur-Oise, both of France

[73] Assignee: Produits Chimiques Ugine Kuhlmann, Paris, France

[22] Filed: Aug. 6, 1974

[21] Appl. No.: 495,717

[30] Foreign Application Priority Data

Aug. 10, 1973 France .............................. 73.29332

[52] U.S. Cl.............................................. 260/566 R
[51] Int. Cl.$^2$...................................... C07C 119/00

[58] Field of Search ................................. 260/566 R

[56] References Cited
UNITED STATES PATENTS 3,209,027  9/1965  Grosklos et al. ................ 260/566 R

*Primary Examiner*—Gerald A. Schwartz
*Attorney, Agent, or Firm*—Beveridge, DeGrandi, Kline & Lunsford

[57] ABSTRACT

A concentrated phosphate solution of the base of a dyestuff of the Auramine series in a hydrophilic solvent (I), which solution is stable to storage and anhydrous; processes for the preparation of such a solution and use of such a solution for colouring paper or inks for flexography.

7 Claims, No Drawings

CONCENTRATED SOLUTION OF A PHOSPHATE OF A DYESTUFF OF THE AURAMINE SERIES

The present invention relates to a concentrated solution of a phosphate of a dyestuff of the Auramine series.

These dyestuffs are principally used for the colouration of paper in the beater and for the colouration of inks for flexography.

In these industries, weighing, filling or transferring operations which cause a high emission of dust having a strong colouring powder are avoided as much as possible, and it is desirable to be able to prepare mother solutions which have the following qualities: a high concentration of dyestuff, the ability to be diluted with water without precipitating, and a good stability to prolonged storage for several months.

In numerous patents, such as, for example, French Pat. Nos. 1,190,365, 1,256,464, 1,355,911, 1,377,024, 1,488,818, 1,506,870, 1,582,391 and 1,595,616 and U.S. Pat. No. 3,209,027, concentrated solutions of salts of dyestuffs of the Auramine series in hydrophilic solvents have already been described, but none of these solutions has the above-described required qualities jointly.

The present invention seeks to fill this gap in prior art.

According to the present invention there is provided a concentrated phosphate solution of the base of a dyestuff of the Auramine series in a hydrophilic solvent (I) which solution is stable to storage and anhydrous.

From the point of view of its constitution, this phosphate corresponds to the combination of a molecule of the base of the dyestuff with 0,5 molecule or preferably one molecule of phosphoric acid $H_3PO_4$.

By the term "anhydrous solution" we mean a solution containing a maximum of 0.5%, and preferably less than 0.1%, by weight of water.

The stability of the solutions of the invention to storage is characterised in that, at ambient temperature, the solutions remain limpid and do not produce any deposit for at least 3 months and even 1 year.

The base of the dyestuff of the Auramine series may be the base of Auramine O (Colour Index 1971 Edition No. 41 000), the base of Auramine G (Colour Index 1971 Edition No. 41 005), the base of ethylauramine (Colour Index 1971 Edition No. 41 001) and the base of the Auramine obtained from N-ethyl ortho toluidine. The formula of the base of the Auramine obtained from N-ethyl ortho toluidine is

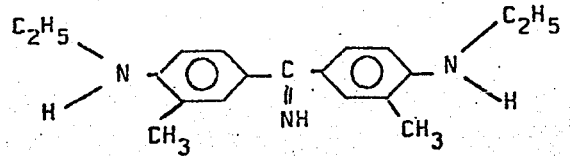

According to the invention, the hydrophilic solvent (I) may be, for example, methanol, ethanol, propanol, furfuryl alcohol, tetrahydrofurfuryl alcohol, ethylene glycol, diethylene glycol, thiodiglycol, triethylene glycol, glycerine, glycol cyanhydrin, glycol monochlorohydrin, diacetone alcohol, the methyl or ethyl ethers or thio-ethers of the above solvents, acetic acid, propionic acid, glycolic acid, lactic acid, formamide, butyrolactone or a mixture of two or more of the above solvents, and preferably methanol, ethanol, ethylene glycol, diethylene glycol, thiodiglycol, glycerine, glycol monochlorohydrin or formamide.

The phosphate concentration of the base of the dyestuff of the Auramine series in the solution of the invention is from 45% to 70%, preferably higher than 50% and more particularly equal or higher than 55% by weight.

The invention includes a process for making the abovedefined solutions, which comprises putting into contact the base of the dyestuff of the Auramine series, phosphoric acid and solvent (I).

The phosphoric acid may be introduced into the process of the invention, for example, in the form of the anhydrous acid, its ammonium salt or a polyphosphoric acid, i.e. a phosphoric acid containing phosphoric anhydride in solution.

In accordance with one embodiment of the invention, the base is put in suspension in solvent (I), then the phosphoric acid is added.

In another embodiment the acid and solvent (I) are put together, then the base is added.

According to a particular feature of the invention, the acid and the base are put in contact with acetone, methyl ethyl ketone or diethylketone, the phosphate is isolated and then it is dissolved in solvent (I). According to another form of the invention, the base is used in its free form which has been isolated by neutralising a salt of the base in acetone, ethylmethylketone or diethylketone. Because of the intermediate isolation of the phosphate or base, the corresponding solution of phosphate in solvent (I) is obtained in its purest form.

According to one form of the invention, the base can be used in the form of its solution in a hydrophobic solvent (II) having a boiling point no higher than 150°C. and the layer containing this solvent (II) separated by decantation after the base has been extracted therefrom. Benzene, toluene, xylene, chlorobenzene, trichloroethylene, perchloroethylene and chloroform are used advantageously for solvent (II).

The invention also includes a process for the colouration of paper, inks for flexography, printing inks, textile fibres, leather or plastics materials, which comprises using for their colouration a concentrated solution according to the invention.

The invention is illustrated by the following non limiting examples, wherein parts and percentages are understood by weight:

EXAMPLE 1

321.5 parts of Auramine O are put in suspension, whilst being stirred, in 680 parts of acetone and 140 parts of water. 340 parts by weight of 30% soda are added to this suspension. The temperature rises from 20°/22°C. to 35°C. A transition to solution is then observed, following by precipitation of the Auramine base in crystalline form. The mixture is allowed to return to ambient temperature, is cooled to 0°–5°C. for 4 hours, filtered and washed twice with 400 parts by weight of 50% acetonewater mixture. The filtered material is then dried at 70°–80°C. for 24 hours and 212 parts of Auramine O base with a melting point of 135°–136°C. are obtained. (The theoretical melting point is 136°C.)

26.7 parts of the base thus obtained are put in suspension in 24 parts of ethylene glycol. Then 4.9 parts of 100% phosphoric acid are added whilst the temperature is maintained at 20°–25°C. by means of a cooling bath, and the mixture is stirred until total dissolution is reached. Thus 55 parts of a solution containing 57% by weight of Auramine O phosphate are obtained giving a limpid solution when diluted with water.

EXAMPLE 2

267 parts of the base of Auramine O are put in suspension in 1600 parts of acetone. Then, stirring very briskly, 49 parts of 100% phosphoric acid are added. The Auramine phosphate is precipitated very quickly. Stirring is contained for 15 minutes, the mixture is filtered and the filtered material is washed three times with 80 parts of acetone and dried at reduced pressure for 8 hours at 50°C. 285 parts of Auramine O phosphate are thus obtained.

By mixing 25 parts of the phosphate thus obtained with 20 parts of formamide, a solution is obtained containing 55% by weight of Auramine phosphate.

EXAMPLE 3

25 parts of the Auramine O phosphate of Example 2 are put in solution in 20 parts of ethylene glycol. Thus a solution is obtained containing 55% by weight of Auramine phosphate.

EXAMPLE 4

25 parts of the Auramine O phosphate of Example 2 are put in solution in 16 parts of glycol monochlorohydrin. Thus a solution is obtained containing 60% by weight of Auramine O phosphate.

EXAMPLE 5

In Example 4, the glycol monochlorohydrin is replaced weight by weight by methanol.

EXAMPLE 6

321.5 parts of Auramine O are put in suspension in 1750 parts of toluene. Then, whilst stirring, 630 parts of water and 156 parts of 30% soda are added. The temperature is raised to 60°C. the toluene phase containing the Auramine base is decanted and washed with 1200 parts of water at 60°C., the water contained in the toluene phase is eliminated at slightly reduced pressure, the toluene phase is cooled and 280 parts of ethylene glycol and 49 parts of 100% $H_3PO_4$ are added. The glycolic solution is separated by decantation and the toluene residues are expelled from the solution by heating under pressure. 590 parts of an Auramine phosphate solution in ethylene glycol are obtained, this solution containing 5 3,5 % by weight of this salt and giving a limpid solution when diluted with water.

EXAMPLE 7

26.7 parts of Auramine O base are put in suspension in 160 parts of acetone. Then, stirring very briskly, 11 parts of 104% polyphosphoric acid in $H_3PO_4$ are added. The Auramine phosphate is precipitated very rapidly. After stirring for 15 minutes, the mixture is filtered, the filtered material is washed with 160 parts of acetone and dried at reduced pressure at 50°C. for 8 hours. 27.6 parts of Auramine phosphate are obtained.

20 parts of this phosphate are put in solution in 16 parts of formamide, and 36 parts of a solution of a 55% by weight Auramine phosphate are thus obtained.

EXAMPLE 8

200 parts of Auramine hydrochloride obtained from diethylaniline are put in suspension in 1300 parts of xylene and 2000 parts of water. The temperature is raised to 60°C. and 290 parts of 30% soda are added. The Auramine base thus obtained in solution in xylene is decanted at 60°C., washed with water and then dehydrated under pressure. Then 2600 parts of acetone and 54 parts of 100% phosphoric acid are introduced. The Auramine phosphate is decanted, washed in acetone and then dried at reduced pressure at 50°C. for 24 hours. 175 parts of phosphate are obtained, this being in the form of an orange powder after being powdered.

By dissolving 25 parts of this phosphate in 16 parts of formamide, a 60% by weight solution is obtained which gives a limpid solution when diluted with water.

EXAMPLE 9

If, in Example 8, the formamide is replaced by glycol chlorohydrin, a solution is obtained having the same weight content and the same properties.

EXAMPLE 10

In Example 8, the formamide is replaced weight by weight by methanol and a solution is obtained having the same weight content and the same properties.

EXAMPLE 11

25 parts of the phosphate obtained in Example 8 are put in solution in 20 parts of ethylene glycol. A solution is obtained having a content of 55% by weight of dyestuff and being miscible in all proportions with water.

EXAMPLE 12

In Example 11, the ethylene glycol is replaced by diethylene glycol and a solution is obtained having the same weight content and the same properties.

EXAMPLE 13

165 parts of the Auramine hydrochloride obtained from diethylaniline are put in suspension, whilst stirring, in 200 parts of water and 600 parts of xylene. The temperature is raised to 60°C. and 260 parts of 30% soda are added. The xylene phase containing the Auramine base is decanted, washed in water and then dehydrated at reduced pressure. Then 150 parts of formamide and 45 parts of 100% $H_3PO_4$ are added. The solution of dyestuff in the formamide is decanted and the toluene residues are eliminated by heating the solution to 50°C. at reduced pressure. 340 parts of phosphate solution are obtained with a content of approximately 55% by weight.

EXAMPLE 14

Example 13 is performed while replacing 45 parts of 100 % phosphoric acid by 22,5 parts and 150 parts formamide by 130 parts, thereby obtaining 295 parts of a phosphate solution having a content of 55 % by weight.

According to another mode of realisation of that example, formamide is replaced by ethylene-glycol diethyleneglycol, triethyleneglycol or glycol chlorhydrine, good results being thereby obtained.

We claim:

1. A concentrated phosphate solution of the base of a dyestuff of the Auramine series in a hydrophilic solvent (I), which solution is stable to storage and anhydrous, said solvent being selected from the group consisting of propanol, furfuryl alcohol, tetrahydrofurfuryl alcohol, triethylene-glycol, glycol cyanohydrin, diacetone-alcohol, the methyl or ethyl ethers or thio-ethers of said solvents, acetic acid, propionic acid, glycolic acid, lactic acid, butylrolactone, methanol, ethanol, ethylene glycol, diethylene glycol, thiodiglycol, glycerine, glycol monochlorohydrin, formamide or a mixture of two or more said solvents.

2. Solution as claimed in claim 1 in which there is less than 0.1% by weight of water.

3. Solution as claimed in claim 1 in which the base of the dyestuff of the Auramine series is the base of Auramine G or the base of the Auramine obtained from N-ethyl ortho toluidine.

4. Solution as claimed in claim 1 in which the base of the dyestuff is the base of Auramine O or of ethylauramine.

5. Solution as claimed in claim 1 in which the phosphate concentration of the base of the dyestuff of the Auramine series is from 45% to 70% by weight.

6. Solution as claimed in claim 5 in which the phosphate concentration is higher than 50% by weight.

7. Solution as claimed in claim 5 in which the phosphate concentration is at least 55% by weight.

* * * * *